United States Patent [19]

Uhlig

[11] 4,170,622
[45] Oct. 9, 1979

[54] METHOD OF MAKING A BLOWN HOLLOW ARTICLE HAVING A RIBBED INTERIOR SURFACE

[75] Inventor: Albert R. Uhlig, Toledo, Ohio

[73] Assignee: Owens-Illinois, Inc., Toledo, Ohio

[21] Appl. No.: 931,655

[22] Filed: Aug. 7, 1978

Related U.S. Application Data

[63] Continuation-in-part of Ser. No. 802,275, May 26, 1977, abandoned.

[51] Int. Cl.² ............................................. B29C 17/07
[52] U.S. Cl. .................................. 264/520; 264/530; 264/534
[58] Field of Search .................. 264/89, 90, 92, 94, 264/96–99, 296, 520, 529, 530, 531, 534, 535, 537–543; 425/525, 530

[56] References Cited

U.S. PATENT DOCUMENTS

| | | | |
|---|---|---|---|
| 3,398,428 | 8/1968 | Fuerst et al. | 264/98 X |
| 3,956,441 | 5/1976 | Uhlig | 264/98 X |

*Primary Examiner*—Jan H. Silbaugh
*Attorney, Agent, or Firm*—Charles S. Lynch; M. E. Click; D. H. Wilson

[57] ABSTRACT

A method is disclosed for reinforcing hollow articles, such as bottles, blow molded from a heated thermoplastic material. A hollow parison is preformed with concave grooves in its exterior surface and corresponding ribs on its interior surface at locations in which the finished article is to be reinforced. The parison is then blow molded into the finished article. The blowing pressure and the temperature of the thermoplastic material collapse and fuse the concave grooves to form solid reinforcement ribs located inside the article while the exterior of the article has a rib-free surface defined by the blow mold.

2 Claims, 9 Drawing Figures

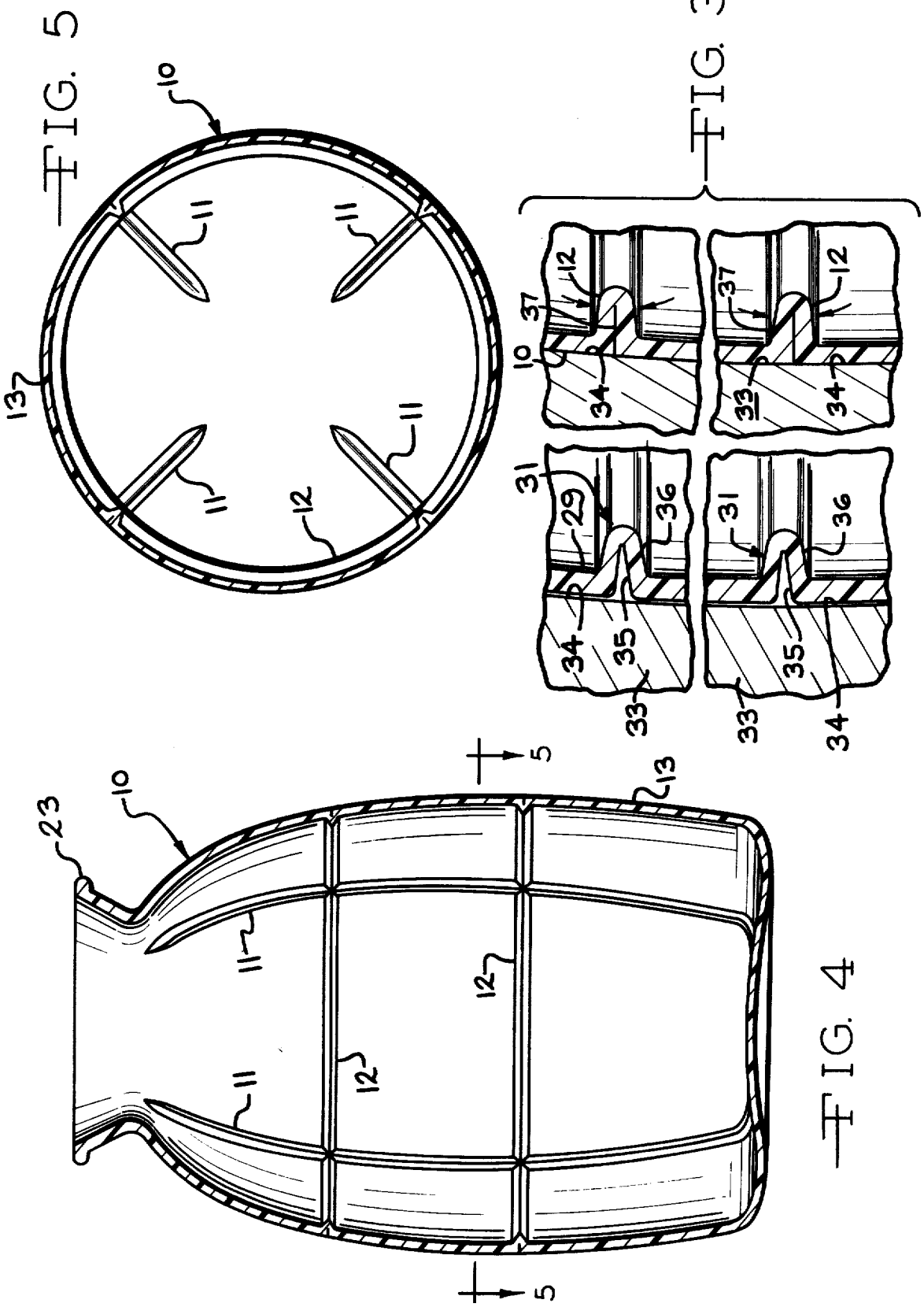

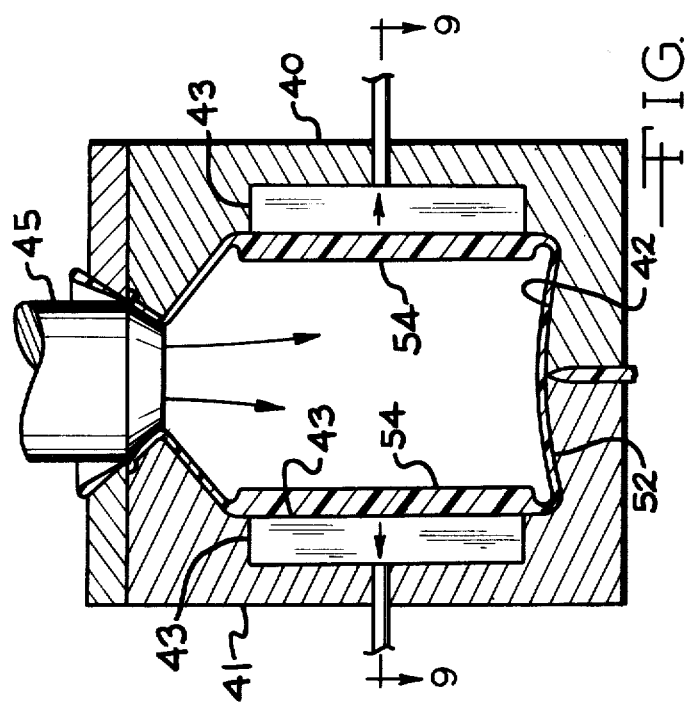
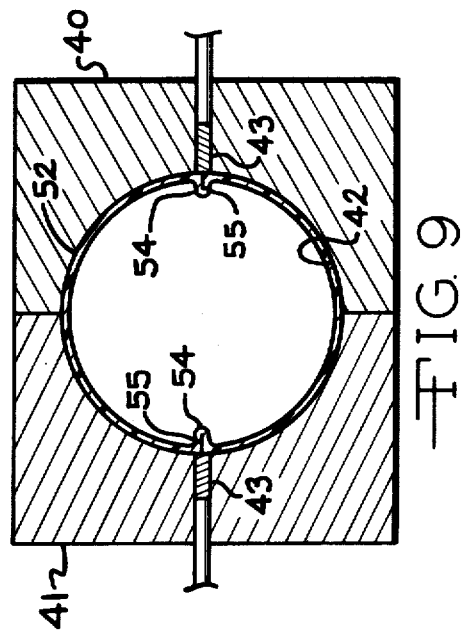
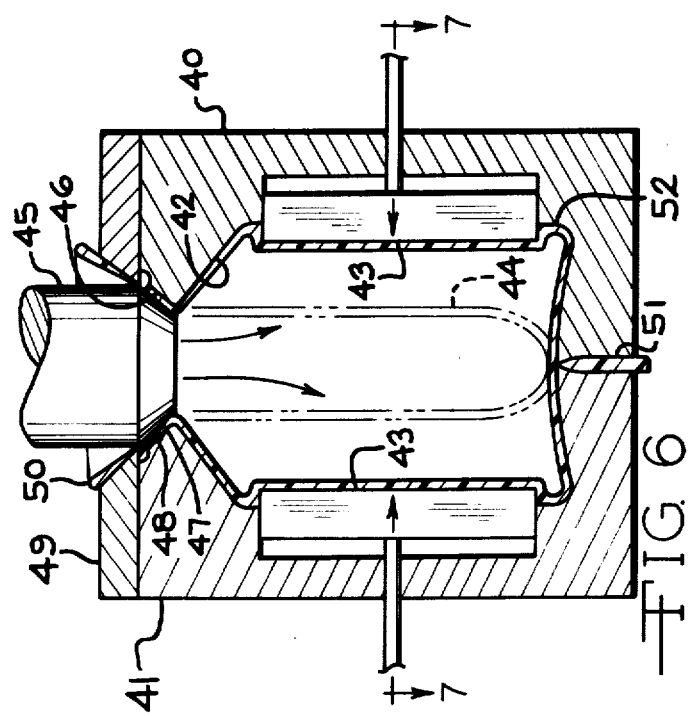
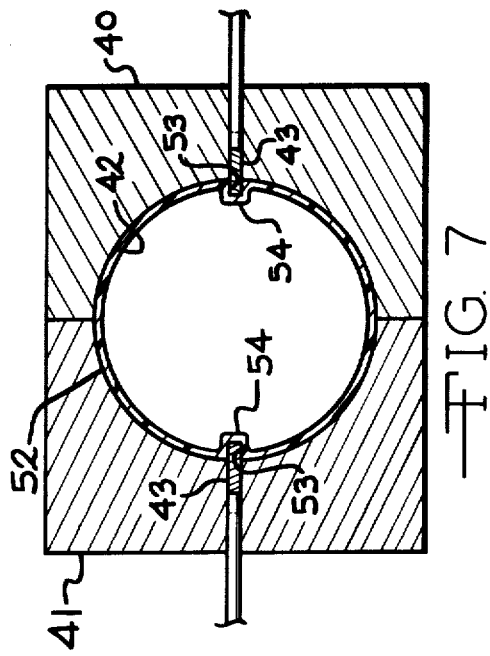

METHOD OF MAKING A BLOWN HOLLOW ARTICLE HAVING A RIBBED INTERIOR SURFACE

This application is a continuation-in-part of Ser. No. 802,275, filed May 26, 1977 now abandoned.

BACKGROUND OF THE INVENTION

This invention relates to plastic and non-metallic article shaping and more particularly to a method for blow molding hollow articles from a heated thermoplastic material with reinforcement ribs formed on the interior surfaces of the article.

In order to save material, plastic bottles which do not require great strength characteristics, such as in half pint bottles for milk and similar drinks, have been formed with thin wall thicknesses. Many of these bottles, however, require reinforcement in the form of externally projecting ribs to compensate for wall thickness. Because these ribs are positioned on the exterior surface of the bottle, they must be arranged to appear as a decorative effect to aesthetically please the consumer. Accordingly, the external reinforcement ribs are generally arranged around the entire circumference of the bottle and sometimes along the entire length of the bottle. Such an arrangement results in two primary disadvantages. First, labelling or decorative space is limited or interfered with by the protruding external ribs. Second, greater amounts of material are required to form the ribs to accomplish the decorative effect. The present invention overcomes these disadvantages by providing a bottle having internal reinforcement ribs which do not interfere with other decoration on the bottle. The internal ribs can be discontinuous so that the bottle can be strengthened only where necessary or desired, and, therefore, which provide for a material savings.

It is known in the prior art to extrude a tubular plastic parison having external reinforcement ribs which are reversed during the blow molding process to provide internal reinforcement to a blown bottle, as described in U.S. Pat. No. 3,114,932 to Donnelly. It is also known in the prior art to injection mold a plastic parison having a localized thickened region which reinforces the heel of a blown bottle, as disclosed in U.S. Pat. No. 3,137,748 to Makowsky. A primary drawback in the method disclosed in U.S. Pat. No. 3,114,932 is the inability to form circumferential grooves in the plastic parison which are destined to become circumferential reinforcement ribs on the container, without providing a variable extrusion die which is costly because of the required machining, tooling and multiplicity of die parts. In still another known prior method, as disclosed in my prior U.S. Pat. No. 3,956,441, it is taught that convex or externally projecting ribs may be molded in a preformed parison. When the preformed parison is subsequently blow molded in a conventional manner, the external ribs in the preformed parison reverse to form wide ribs of a relatively low height on the interior of the bottle. Since the shape of the parison and the locations of the ribs are precisely molded in the preformed parison, they are precisely defined in the finished bottle or other hollow article blown from the preformed parison. The main disadvantages of this method are that it does not permit forming narrow ribs and the height of the ribs are not easily controlled. To increase the height of the ribs, considerably more material is required since the width of the ribs is also increased. In Fuerst et al. U.S. Pat. No. 3,398,428 is disclosed in FIG. 7 a parison having external grooves and adjacent opposing these grooves radially are internal grooves and not ribs as in my invention.

SUMMARY OF THE INVENTION

According to the present invention, a method is provided for forming bottles and other hollow articles from a thermoplastic material with internal reinforcement ribs at preselected locations and having predetermined heights. Initially, a parison is either extruded or injection molded from a heated thermoplastic material in a conventional manner. In one embodiment of the invention, the parison is preformed by blowing or expanding within a pre-blow mold. The pre-blow mold is formed from mold halves which are separable to permit removal of the preformed parison. The pre-blow mold halves define a cavity for shaping the parison which includes convex ribs or projections of a relatively narrow width extending into the mold cavity for molding grooves in the exterior surface of the parison. When the grooves are formed in the exterior surface, the interior surface is similarly deformed with internal ribs. After the parison is preformed in the pre-blow mold, it is transferred to a final blow mold and expanded or blown into contact with cavity walls within the blow mold. As the preformed parison is expanded into contact with the blow mold, the grooves collapse to form internal reinforcement ribs within the hollow blown article. Sufficient heat is retained within the thermoplastic material during the final blow mold operation and sufficient pressure is applied to cause the collapsed ribs to fuse together into solid internal reinforcement ribs. The location and the height of the ribs in the finished article are accurately determined by the location and height of the convex ribs or projections within the pre-blow mold cavity.

In a second embodiment of the invention, a parison is formed in a conventional manner either by injection molding or by extrusion. The parison is positioned in a cavity in a final blow mold. Extendable pads are mounted within the cavity walls in the final blow mold at locations in which the finished article is to be reinforced with internal ribs. The pads are initially extended into the blow mold cavity by pneumatic cylinders, solenoids or other conventional control means. While the pads are extended, the parison is blown into contact with the pads and the blow mold cavity walls. As a consequence, the pads form grooves in the exterior surface of the blown article which extend into the hollow interior of the article at the locations in which the article is to be reinforced with internal ribs. After the parison is expanded and while the pressure is still applied to the interior of the blown article, the pads are retracted to a position wherein they are flush with the walls of the blow mold cavity. At this time, the voids or grooves formed in the exterior surface of the blown article are collapsed through the air pressure maintained within the article. The surfaces of the collapsed grooves are then reheated due to thermal conduction from the hotter thermoplastic material on the interior of the article and the abutting collapsed groove surfaces fuse together to form integral ribs projecting into the interior of the finished article. The hollow, reinforced finished article is allowed to cool and is then removed from the blow mold cavity.

Accordingly, it is an object of the invention to provide a method for blow molding internally reinforced hollow articles from a thermoplastic material.

Another object of the invention is to provide a method for forming internal reinforcement ribs at preselected locations and having predetermined heights within the interior of a blow molded bottle and similar hollow blow molded articles.

Other objects and advantages of the invention will become apparent from the following detailed description, with reference being made to accompanying drawings.

BRIEF DESCRIPTION OF THE DRAWINGS

FIG. 3 is an enlarged, fragmentary cross sectional view showing the expansion of a section of the preformed parison into the finished article with solid internal reinforcement ribs;

FIG. 4 is a vertical cross sectional view through a reinforced bottle blow molded in accordance with the present invention;

FIG. 5 is a horizontal cross sectional view through a reinforced bottle taken along line 5—5 of FIG. 4;

FIG. 6 is a vertical sectional view of a final blow mold constructed in accordance with a modified embodiment of the invention and having pads extended from the walls of the cavity for forming grooves in the exterior surface of the blown article;

FIG. 7 is a cross sectional view taken along line 7—7 of FIG. 6;

FIG. 8 is a vertical sectional view through a final blow mold similar to that in FIG. 6, but with the pads retracted; and FIG. 9 is a cross sectional view taken along line 9—9 of FIG. 8.

DESCRIPTION OF THE PREFERRED EMBODIMENT

Figure 1:
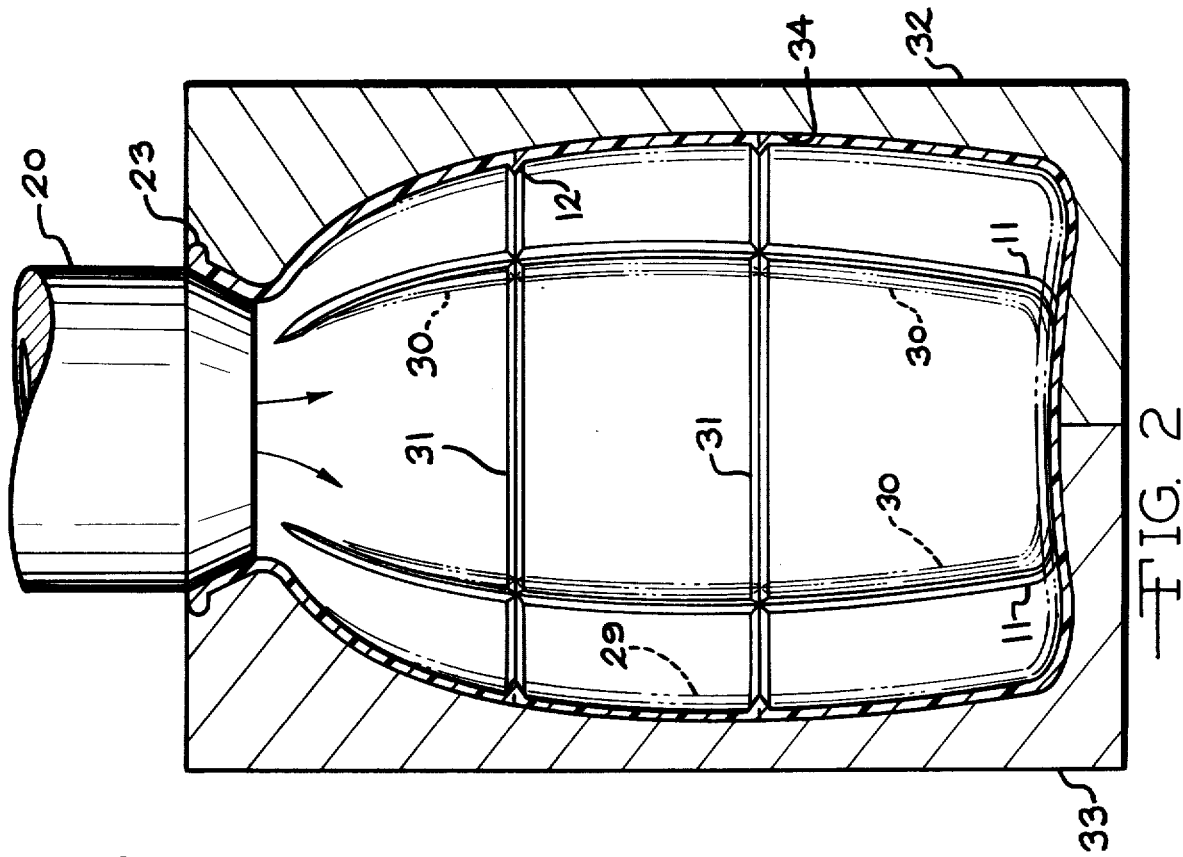
FIG. 1 is a vertical sectional view of an initial step of a first embodiment of the present invention illustrating the preforming of an extruded tubular parison in a pre-blow mold having convex ribs projecting from the mold cavity walls.
Figure 2:
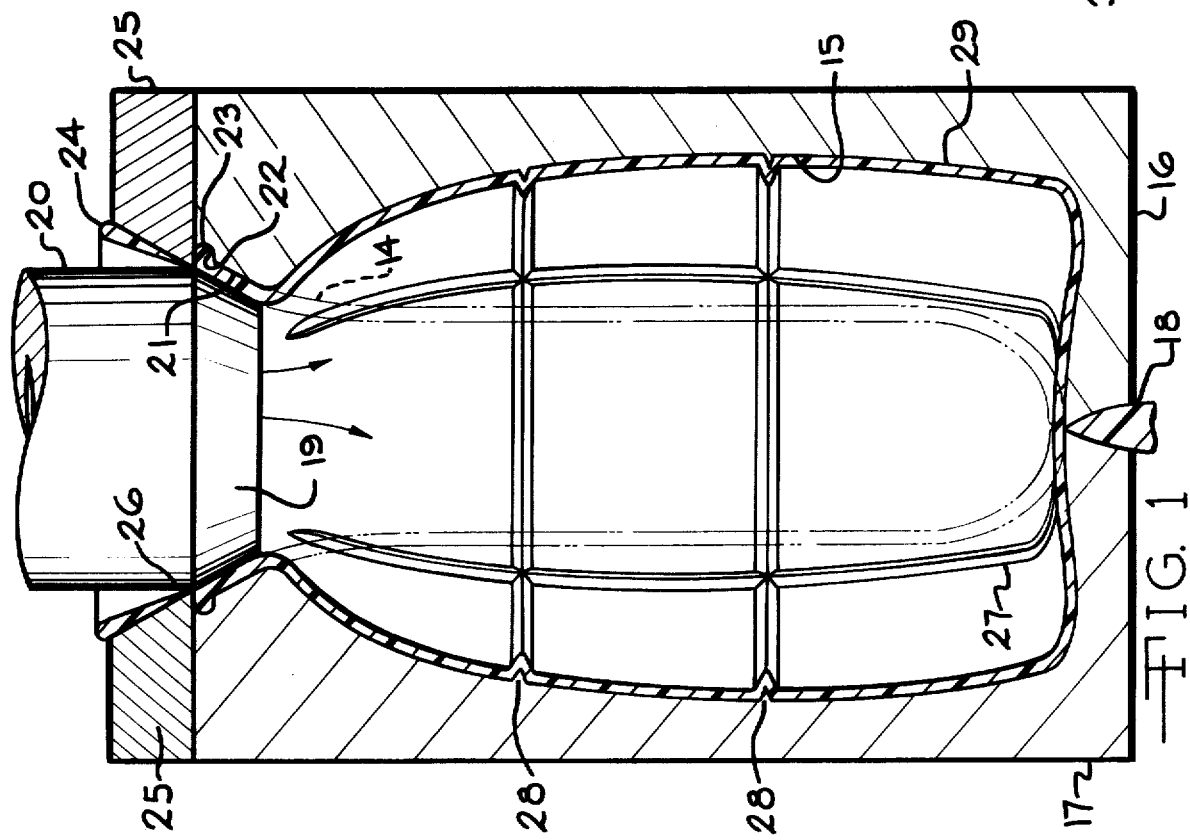
FIG. 2 is a vertical sectional view through a final blow mold illustrating the expansion of the preformed parison into a finished article having internal reinforcement ribs.

Turning now to the drawings, FIGS. 1-3 illustrate a method for blow molding an internally ribbed reinforced bottle 10 which is shown in vertical and horizontal section in FIGS. 4 and 5, respectively. The bottle 10 is provided with a plurality of vertically oriented internal ribs 11 and a plurality of horizontally oriented internal ribs 12. The ribs 11 and 12 permit decreasing the thickness of walls 13 forming the bottle 10 over walls of similar bottles without significantly reducing the strength of the bottle 10. This in turn provides several commercial benefits, such as reducing the material cost for the bottle 10 and reducing the shipping weight of the bottle 10 over that of conventional bottles having the same dimensions and strength properties.

Referring now to FIG. 1, the first steps in forming the bottle 10 in accordance with the present invention are illustrated. The bottle 10 is formed by what is known in the art as the "blow and blow" process, wherein a parison is preformed by blowing within a pre-blow mold slightly smaller than a final blow mold cavity and the preformed parison is then transferred to the final blow mold cavity and blown into the final shape of the bottle 10. Initially, a tubular parison 14 is extruded from a heated thermoplastic material from which the bottle 10 is to be formed, such as polyethylene (PE). After the tubular parison is extruded, it is enclosed within a cavity 15 defined between two pre-blow mold halves 16 and 17. The mold halves 16 and 17 are moved together to enclose the tubular parison 14 by conventional pneumatic, hydraulic or mechanical controls. When the mold halves 16 and 17 are closed upon the parison 14, a lower end or tail 18 is pinched off, leaving a precise quantity of the thermoplastic material within the mold cavity 15. As the tail 18 is pinched, the adjacent lower end of the parison 14 is sealed. The upper end of the parison 14 is compressed between a tapered calibrating section 19 on a blow pipe 20 and a neck forming section 21 of the pre-blow mold cavity 15, which section includes an annular shaped groove 22 to form a lip 23 on the bottle 10. As an alternative, a threaded neck is formed in place of the lip 23. Flash 24 is trimmed from the upper end of the parison by a pair of parison neck trimmers 25 having cutting edges 26 which are advanced into contact with the blow pipe 20.

The cavity 15 defined by the pre-blow mold halves 16 and 17 has dimensions slightly smaller than the final dimensions of the finished bottle 10. Convex vertical ribs 27 and convex horizontal ribs 28 extend into the cavity 15 at locations of the parison which eventually form reinforced areas of the bottle 10. Compressed air is forced through the blow pipe 20 into the tubular parison 14 to expand the parison 14 into contact with the mold cavity 15, thereby forming a preformed parison 29. The convex ribs 27 and 28 projecting into the mold cavity 15 form corresponding ribs 30 and 31 in the interior of the preformed parison 29.

After the tubular parison 14 is expanded into contact with the mold cavity 15 to define the preformed parison 29, the mold halves 16 and 17 are separated and the preformed parison 29 is transferred into a final blow mold formed from mold halves 32 and 33 which define a cavity 34, as shown in FIG. 2. The final blow mold cavity 34, which precisely defines the exterior dimensions of the finished bottle 10 which is blown therein, is only slightly larger than the pre-blow mold cavity 15, typically no more than 1/32 to 1/16 inch larger. After the mold halves 32 and 33 are moved together to enclose the preformed parison 29 within the cavity 34, compressed air is injected through the blow pipe 20 to expand the preformed parison 29 into contact with the walls of the cavity 34, thereby shaping the bottle 10.

Referring to the enlarged fragmentary view of FIG. 3, the manner in which the finished ribs 12 in the bottle 10 are formed during the final blow molding step is illustrated. The horizontal annular ribs 31 in the preformed parison 29 are in the form of a generally V-shaped groove 35 molded in the exterior surface of the preformed parison 29 and similar V-shaped ridges 36 in the interior surface of the preformed parison 29. As the preformed parison 29 is expanded or blown into contact with the final blow mold cavity 34, the air pressure closes or collapses the V-shaped groove 35 along a line 37, leaving the inwardly projecting annular ribs 12 in the blown bottle 10. Sufficient residual heat remains within the thermoplastic material and sufficient air pressure is applied to the interior of the bottle 10 to cause a welding or fusion along the line 37, thereby resulting in a solid reinforcement rib extending around the inside of the blown bottle 10. The solid vertical ribs 11 which project into the interior of the blown bottle 10 are produced in a similar fashion. As a consequence of the internal reinforcement ribs 11 and 12, the general wall thickness of the blown bottle 10 may be reduced without sacrificing strength. This in turn reduces the weight of the blown bottle 10 and also leaves the bottle 10 with a smooth exterior surface which is readily decorated without interference from the ribs 11 and 12. Through the use of the present invention, the internal ribs 11 and 12 may be located at any desired point on the interior of the bottle 10 and may be provided with any desired length. Furthermore, the reinforcement ribs 11 and 12 may be made with a predetermined height by controlling the height of the ribs 27 and 28 in the parison pre-blow mold cavity 15.

Ribs have a greater mechanical strength than the essentially flat surface of the body of the preform and in addition internal ribs formed by blow molding are inherently thicker than the contiguous portions of the walls that have been expanded to a greater degree. Therefore, there is initially a differential expansion in the second blow molding step. When the main body of the preform material hits the smooth mold wall in the second blow mold the surface thereof is frozen because a blow mold wall is always colder than the plastic. All of the foregoing is well known and is given as background only. The rib material is not frozen because it does not initially touch the wall, as will be understood. Continued application of pressure however causes the hotter rib material to deform and fill the gap between its facing exterior walls, as will be understood. Of course, if the initial rib is very shallow the final internal rib may be shallow and not sharply defined, but it will be present.

Turning now to FIGS. 6–9, a modified embodiment of the invention is shown wherein a blow molded bottle having internal reinforcement ribs is formed without first preforming a parison in a parison pre-blow mold. The reinforced bottle is formed in a blow mold formed from two separable mold halves 40 and 41 which define an internal cavity 42 in which the finished bottle is blown. Movable pads 43 are recessed within the walls of the mold halves 40 and 41 which define the cavity 42 adjacent locations at which reinforcement ribs are to be located on the inside of the finished bottles blown in the cavity 42. The pads 43 are movable through conventional hydraulic, pneumatic, or mechanical means, between an extended position, as shown in FIGS. 6 and 7, and a retracted position, as shown in FIGS. 8 and 9.

Referring first to FIGS. 6 and 7, a hollow parison 44 is initially extruded or injection molded in a conventional manner. The mold halves 40 and 41 are then closed about the parison 44 and a blow pipe 45 is inserted into a neck forming section 46 of the cavity 42. The blow pipe 46 includes a tapered calibrating section 47 which cooperates with the neck forming section 46 for accurately forming a bottle neck 48 in the upper end of the parison 44. A pair of split neck trimmers 49 are then moved into contact with the blow pipe 45 for trimming flash 50 from the bottle neck 48. When the mold halves 40 and 41 were closed on the parison 44, a tail 51 of excess thermoplastic material was pinched between the mold halves 40 and 41 below the cavity 42 when the parison was formed by extrusion. After the flash 50 and the tail 51 are removed from the parison 44, a precise measure of thermplastic material remains within the mold cavity 42 for forming a bottle.

After the mold halves 40 and 41 are closed on the parison 44, air is injected through the blow pipe 45 to expand the parison 44 into contact with the walls of the cavity 42 and the pads 43 to form a hollow bottle 52. At this time, the pads 43 are extended into the mold cavity 42. The pads 43 are shaped and are located for forming a desired pattern of ribs 54 in the bottle 52. As shown in the cross section of FIG. 7, the extended pads 43 form concave grooves 53 in the exterior surface of the bottle 52 and the corresponding convex ribs 54 on the interior surface of the bottle 52. At this stage, the bottle 52 is similar to a preformed parison except that it is already in and contacts the walls of the final blow mold cavity 42. After the bottle 52 is blown, the pads 43 are retracted, as shown in FIGS. 8 and 9. When the pads 43 are retracted, they extend flush with and complete the walls of the mold cavity 42. At this time, air pressure either is maintained or is reapplied through the blow pipe 45 to the interior of the blown bottle 52. The air pressure is sufficient to collapse the grooves 53 which extend within the ribs 54. When the grooves 53 are collapsed, they close along a line 55 to produce a continuous, smooth exterior surface on the bottle 52. Sufficient air pressure is maintained on the interior of the bottle 52 and sufficient residual heat remains within the thermoplastic material forming the ribs 54 to fuse the thermoplastic material along the line 55, thereby forming solid integral reinforcement ribs on the interior surface of the blow bottle 52. The height of the ribs 54 is determined by the extent to which the pads 43 were initially extended into the mold cavity 42. Thus, the ribs 54 were formed on the interior surface of the blown bottle 52 at predetermined locations and to extend to a predetermined height, without first preforming the extruded parison 44.

It will be appreciated that although two preferred embodiments of the method of the present invention have been described above, various modifications and changes may be made without departing from the spirit and the scope of the following claims. It will also be appreciated that the method is adaptable for use with various thermoplastic materials which are commonly used for blow molding various types of hollow articles.

I claim:

1. In a blow molding method for forming a hollow article from a thermoplastic material tubular parison heated to a moldable temperature, a method for forming internal integral reinforcement ribs in the article comprising the steps of: blow molding the heated thermoplastic material parison to form a hollow parison preform slightly smaller than the article and with concave grooves in an exterior surface of said parison preform and corresponding opposing adjacent convex ribs in an interior surface of said parison preform at locations to be reinforced in the finished article, blow molding the finished article by expanding said parison preform in a final blow mold cavity with sufficient force and while the thermoplastic material is still heated to collapse and fuse the facing walls of each of said concave grooves to form a final article having integral solid internal reinforcement ribs and a continuous exterior surface, wherein the walls of the final blow mold are colder than said parison preform and thus freeze the surface of the article blown therein, except at the surfaces of the grooves which do not contact the mold wall and thus remain relatively hot and thus with continued blowing the rib material deforms and fills the groove gaps to form said ribs and said continuous exterior surface.

2. A method for forming internal reinforcement ribs in a blow molded article, wherein a hollow parison is placed in a hollow blow mold cavity having retractable pads extending inwardly from the interior surface of the mold cavity, expanding said parison against the relatively cold walls of said cavity and said pads to make a preform and to form concave grooves opposite said pads in the exterior surface of the resulting expanded preform and corresponding inwardly extending convex ribs in the interior surface thereof, retracting said pads flush with the interior of said mold surface and continuing applying blowing pressure to the interior of said article sufficient to collapse said grooves so that each groove closes and the facing walls thereof fuse to form a final article having solid integral internal reinforcing ribs and a continuous exterior surface.

* * * * *